March 9, 1965    W. T. JONES    3,172,489
EARTH BORING DRILL WITH CUTTING REMOVER
Filed Nov. 20, 1963

WARREN T. JONES
INVENTOR.

BY Roy H. Smith, Jr.
ATTORNEY

United States Patent Office 3,172,489
Patented Mar. 9, 1965

3,172,489
EARTH BORING DRILL WITH CUTTING REMOVER
Warren T. Jones, Houston, Tex., assignor to Hughes Tool Company, Houston, Tex., a corporation of Delaware
Filed Nov. 20, 1963, Ser. No. 325,095
8 Claims. (Cl. 175—394)

This invention relates generally to earth boring drills and more particularly to drills having novel means for removing the cuttings from the bore hole.

In earth boring operations it is critical to quickly remove the cuttings, which are created by the destructive action of the drill. If cuttings from a tunnel face, for example, accumulate in the space near the drill, energy is dissipated in regrinding the cuttings. Furthermore, when rotary drills are used, the cuttings wedge between the drill and the tunnel floor, increasing the torque required to rotate the drill and prematurely dulling the cutting elements. To prevent this wasteful consumption of expensive energy, experts in the art have sought for years a method or apparatus capable of rapidly moving the cuttings; success has, unfortunately, been limited.

Space is severely limited in the drill area, for it is filled with cutter assemblies and their supports, leaving little room for apparatus to remove the cuttings. Behind the forward end of the drill, that is, away from the cutter assemblies, there is ample room for conventional cuttings conveyors such as augers. Consequently, the problem lies in getting the cuttings behind the cutter assemblies and their supports. Once the cuttings reach this rearward position, the problem of removing them is less difficult due to the greater space available.

The magnitude of the problem is particularly apparent in view of the structure of one of the most successful rotary drills. The U.S. patent issued to G. W. Baur et al., No. 2,949,281, illustrates such a drill, which has a series of substantially circular, coaxial plates of decreasing diameter with their planar or flat surfaces secured to each other. These plates are transverse to the axis of rotation of the drill, presenting a stepped surface opposite the tunnel face. A plurality of cutter assemblies are secured to this stepped surface, projecting forwardly therefrom to disintegrate the tunnel face as the drill rotates and moves forward. A fluid, such as air or water, is sometimes circulated through passages in the drill to wash the cuttings rearwardly, but frequently it is impossible or impractical to introduce fluids into the tunnel. Furthermore, even when a flushing fluid is used, the cuttings frequently are not moved with sufficient speed, especially when the tunnel is large and fluid is available only in small quantities.

A scraping device is needed to move the cuttings behind the drill, but previous to the present invention, none were found practicable due to the severe space limitations around the drill.

The object of the persent invention is to overcome the aforementioned disadvantages and problems of prior art drills. More specifically, it is an object of this invention to provide an earth boring drill having novel means for moving the cuttings rearwardly from the tunnel face.

Other objects and advantages will become apparent hereinafter and in the drawing in which.

Figure 1:
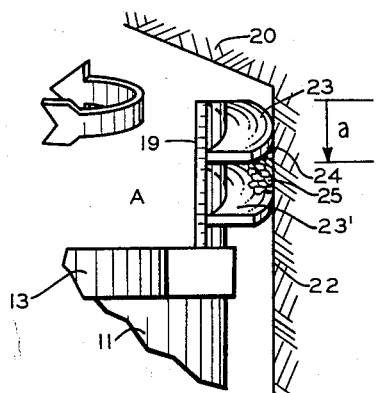
FIGURE 1 is a perspective view of the invention showing the cutter assemblies mounted on plates and the preferred arrangement of the cuttings removers.
Figure 1:
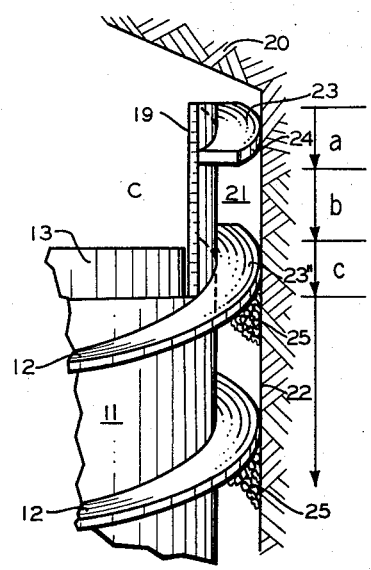
Figure 1:
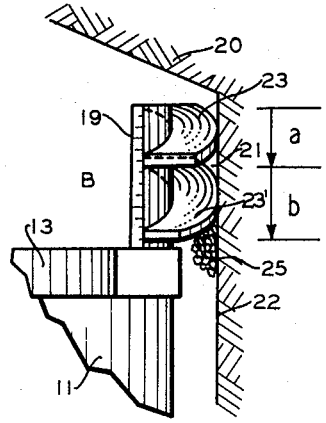
Figure 1:
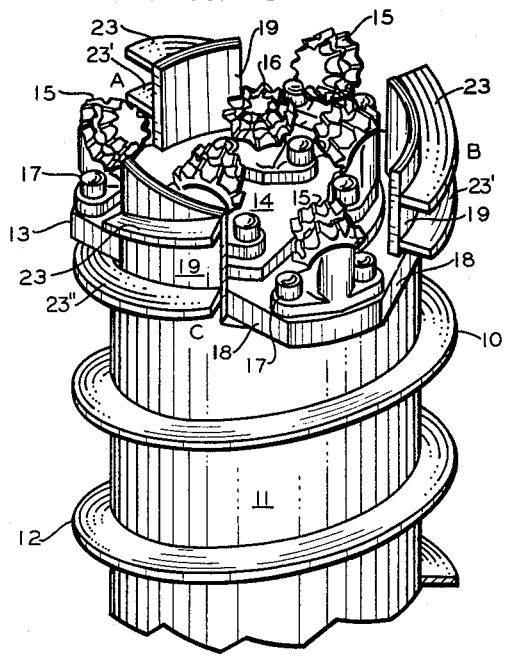
Figure 2:
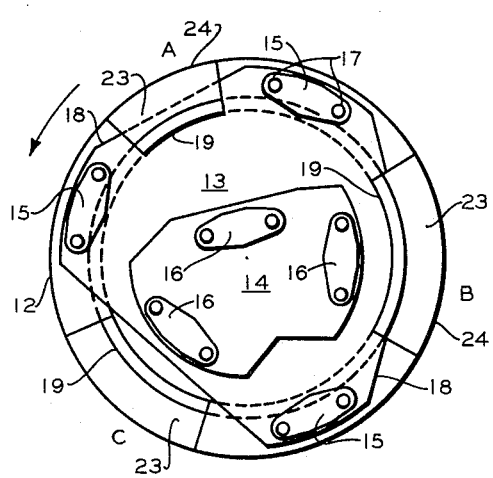
FIGURE 2 is an end view of the drill, illustrating one of many possible arrangements of cutter assemblies and the cuttings removers. Note that the rotatable cutters are not illustrated in this view, their location being indicated only by showing their wing-shaped bases.

FIGURES 3-A, 3-B, and 3-C illustrate in fragmentary elevation the disposition of cuttings removers near the outer periphery of the drill, including their axial placement with respect to each other and the end of the drill and tunnel face.

In describing the preferred embodiment of the invention illustrated in the drawing, specific terminology will be used to add clarity. The invention is not limited to these specific terms, however, or to the specific structure illustrated, but includes all equivalents that operate in a similar manner to accomplish a similar purpose.

Turning now to a detailed description of an embodiment that conforms to the inventive concept, the numeral 10 designates an earth boring drill in general, mounted on a central shaft 11, which has auger flights 12 or any other conventional conveyor means. Central shaft 11 is not part of the invention and can therefore have any construction, including a completely solid construction or, as is shown here, a hollow, cylindrical construction. A base plate 13, which is in effect the drill body, is transversely secured to the central shaft 11 and a plurality of outboard cutter assemblies 15 and a plurality of inboard cutter assemblies 16 are secured respectively to base plate 13 and secondary plate 14. The radial extremities of outboard cutter assemblies 15 define the radial periphery of the drill and similarly the forward extremities of outboard and inboard cutter assemblies 15 and 16 define the forward end of the drill. These portions of the drill form tunnel face 20 and tunnel floor and walls 22. Other parts of the drill must not extend beyond these bounds or forward progress of the drill will be curtailed. For this reason plates 13 and 14 must clear the tunnel floor 22. The number of plates and the location and type of cutter assemblies can vary widely and is not a part of the present invention. It is common, however, to releasably secure the cutter assemblies to the plates by means of cap screws 17, but many other securing means, such as welding, are also employed.

Between the outboard cutter assemblies 15 on base plate 13 are preferably formed chordal surfaces or flats 18 across which extend ribs 19. As illustrated in FIGURE 1, ribs 19 are extensions of central shaft 11, extending toward the end of the drill 10 and the tunnel face 20. When constructed in the above manner, there is a fragmentary annular space 21 between ribs 19 and the tunnel floor 22, as is shown in FIGURES 3-A through 3-C. Rib 19 extends circumferentially as far as possible, but is limited in its width by the location of the outboard cutter assemblies 15.

On the outer surface of each rib 19 is an elongated, transverse blade or scraper 23 that slopes rearwardly in an oblique or helical fashion from a point toward the tunnel face 20 to a point toward base plate 13. When the term "helical fashion" is used, it should be understood that the shape of the scraper is not limited to a precise helix of mathematical origin, nor is it even limited to a spiral shape. Rather, the scraper should lie across the rib in an oblique fashion, the helical configuration being merely the preferred form. The scrapers 23 are preferably spaced at different axial locations so that during rotation of the drill 10, they cumulatively contact tunnel wall 22 all the way from some point near tunnel face 20 to some point behind base plate 13. This feature of the invention is clearly illustrated in FIGURES 3-A through 3-C, where the various scrapers are designated 23, 23' and 23". Scrapers 23 sweep the cuttings 25 rearwardly through distance a, scraper 23' sweeps them through distance b, and scraper 23" sweeps them through distance c. Therefore, it may be seen that the scrapers are spaced at successive longitudinal distances from the forward end of the drill with their ends overlapping slightly. Each rib preferably has also a foremost scraper 23 that scrapes the cuttings 25 away from the intersection of the tunnel floor 22 and the tunnel face 20 so that the outboard cutter assemblies 15 do not engage and regrind the cuttings. In other words, providing a foremost scraper 23 between each pair of adjacent outboard cutter assemblies enables such scrapers to sweep the cuttings 25 quickly to the rear so that each outboard cutter assembly operates on a "clean" portion of the tunnel face and floor.

Notice that rearmost scraper 23'' is illustrated as being a part of auger 12 on central shaft 11. This is not essential but is merely a convenient construction; in other constructions scraper 23'' may be entirely separate from the rearward conveyor means.

In operation the drill 10 is rotated by some means (not shown) and an axial force is applied to drive the drill into the earth formation. Cuttings from the tunnel face 20 are created by the destructive action of the cutter assemblies 15 and 16. These cuttings fall to the tunnel floor 22 where they accumulate, especially at the juncture of the floor 22 the tunnel face 20. As the drill rotates, blades 23 periodically rotate to the tunnel floor, sweeping cuttings 25 away from the tunnel face an axial distance $a$. Similarly, blades 23' and 23'' sweep the cuttings through distances $b$ and $c$. After traversing distance $c$, the cuttings can be removed by conventional augers 12 on central shaft 11.

Having described the preferred embodiment and its mode of operation, the invention can be stated broadly as being an earth boring drill having a plurality of cutter assemblies disposed on at least one transverse plate and at least one but preferably plural scrapers mounted between the cutter assemblies, each of said scrapers being arranged to move the cuttings a certain distance rearwardly along the tunnel floor.

The advantages of the invention are numerous and perhaps obvious, but particularly noteworthy is its ability to move cuttings rearwardly without the need for a flushing fluid. On the other hand, the invention is easily installed on drills that use a flushing fluid, thereby combining the advantages of both these cuttings removing means. Also the invention can be used with mining drills where space is severely limited, this being especially important when plate bits are used, such as the one illustrated in the drawing. Furthermore, the invention has the advantage of simplicity of construction, accompanied by the advantage of decreased maintenance.

Various modifications may be made in the size, shape and arrangement of parts without departing from the scope of the invention. Many changes may be made, for example, to ribs 19, their primary function being only to provide a support for the various blades. Similarly, the blades can have numerous shapes, the critical thing being that they provide a surface that in rotation of drill 10 will move the cuttings 25 rearwardly. The blades may be constructed of any material, preferably one that resists wear. It is advisable under severe wearing conditions to hardface their surfaces, especially outer surface 24, with tungsten carbide in a suitable binder or some other wear resistant material. The number of blades required is a function primarily of the size of the drill and the rate at which cuttings are created. Also, cutter assemblies 15 and 16 need not be the rolling cutter type but may be any type, including the common drag bit type.

It should be noted that the direction of the slope of blades 23 depends on the rotational direction of the drill 10. If the drill rotates counter-clockwise when viewed from tunnel face 20, as is indicated in FIGURE 3–C, the right side of blade 23 should be closest to the tunnel face with its left side more distantly removed therefrom. When the rotation is reversed, the blades must be altered so that their slope is reversed.

The angle of the slope is a function of many variables, including the drilling rate, the type formation drilled, and the size of the tunnel. In some instances, especially when the earth formation is extremely hard, the drill small, and cuttings are created slowly, one scraper having a large slope is sufficient to move the cuttings behind plate 13. When plural scrapers are used, their slope may be small.

I claim:

1. In a rotary earth boring drill having a body and a plurality of cutter assemblies disposed on the body to define the forward end of the drill, some of such cutter assemblies being mounted outboard from the others to define the outermost periphery of the drill and cut the outermost portion of the tunnel face and thereby form the borewall of the hole, such cutter assemblies being spaced from one another by circumferential gaps, the improvement of a novel cuttings remover which comprises:
    (a) at least one rib disposed in one of said gaps and secured to and extending forwardly from the drill body to a point adjacent the forward end of the drill, said rib having an outer surface spaced radially inwardly from said outermost periphery of the drill, and
    (b) at least one elongated scraper transversely disposed on the outer surface of the rib, said scraper extending rearwardly from the forward end of the drill in an oblique fashion, and having an outer edge that confronts said outermost periphery of the drill to engage the cuttings and sweep them rearwardly during rotation of the drill.

2. The improvement of claim 1 which includes:
    (a) a plurality of circumferentially spaced ribs disposed in said circumferential gaps, and
    (b) at least one scraper on each of said ribs, said scrapers extending successive longitudinal distances from the forward end of the drill.

3. The improvement of claim 2 which includes:
    (a) a rib disposed in each said circumferential gap, and
    (b) a scraper disposed on the forward end of each of the ribs so that the cuttings are removed from the path of each of the cutter assemblies defining the radial periphery of the drill.

4. In a rotary earth boring drill having a body and a plurality of cutter assemblies mounted on the body and extending forwardly therefrom so that their cutting extremities define the forward end of the drill and are disposed to cut the face of a tunnel, some of said cutter assemblies being mounted inboard to cut the inner part of the tunnel face while others are mounted outboard to define the outermost periphery of the drill and to cut the outermost portion of the tunnel face and thus form the borewall of the hole, such outboard cutter assemblies being spaced from each other by circumferential gaps, the improvement of a cuttings remover which comprises
    (a) a number of ribs each secured to and extending forwardly from said drill body outwardly of said inner cutters and inwardly of said outermost periphery of the drill and being generally circumferentially disposed in the gaps between said outboard cutter assemblies, and
    (b) a number of elongated scrapers secured to the outer surface of each said rib and extending transversely outwardly therefrom with an outer edge lying in the same cylindrical surface as the outermost periphery of the drill defined by said outboard cutters, each said scraper extending rearwardly in an oblique fashion to engage cuttings lying on the borewall and sweep them rearwardly during rotation of the drill, there being a number of scrapers on said number of ribs which together extend axially from said forward end of the drill to the forward end of the drill body to move cuttings rearwardly the same axial distance.

5. The improvement of claim 4 in which each of said gaps includes a rib between each pair of adjacent outboard cutter assemblies and each said rib has at least one said scraper mounted thereon.

6. The improvement of claim 5 in which one of the scrapers on each said rib extends rearwardly from a point adjacent the forward end of the drill, whereby cuttings lying on the borewall at its intersection with the tunnel face are swept rearwardly, during rotation of the drill.

7. The improvement of claim 5 in which there are a multiplicity of scrapers on each said rib, each said scraper extending axially a portion of the distance from said forward end of the drill body and each said scraper except the most forwardly disposed extending axially at least from the axially rearward end of a forwardly adjacent scraper which precedes it during rotation, whereby cuttings may be moved progressively rearwardly during rotation.

8. In a rotary earth boring drill suitable for tunneling operations and including a body and a multiplicity of cutters secured to and extending forwardly of the body so that during rotation they are capable of cutting a rock formation to define a tunnel face and a borewall, such cutter progressively disintegrating the tunnel face to form rock cuttings which tend to accumulate at the intersection of the tunnel face and the lowermost portion of the borewall, the tunnel floor, some of said cutters being radially inwardly disposed to cut the inner portion of the tunnel face while others are disposed radially outwardly to cut the outer portion, such outer cutters being spaced apart circumferentially, the improvement for moving said cuttings rearwardly to avoid repetitive grindings of said cuttings and undue wear to portions of said drill comprising a number of helical scrapers each disposed between adjacent outer cutters and supported by and secured to appropriately disposed ribs extending forwardly from and secured to the drill body, each said scraper being elongated circumferentially and having an outer edge confronting the borehole to be defined by said outer cutters, and being so pitched as to move cuttings lying on the tunnel floor rearwardly from the tunnel face as such cuttings are contacted by the rearward face of the scraper, said number of scrapers together extending axially from the forward end of the outer cutters at least approximately to the forward end of the drill body.

References Cited by the Examiner
UNITED STATES PATENTS

| | | | |
|---|---|---|---|
| 1,729,063 | 9/29 | Bull | 175—394 X |
| 2,750,176 | 6/56 | Cartlidge | 175—388 X |
| 3,092,190 | 6/63 | Gruere | 175—323 X |

CHARLES E. O'CONNELL, *Primary Examiner.*

BENJAMIN BENDETT, *Examiner.*